July 23, 1940. A. H. JOHNSON 2,208,635
MEANS FOR AMPLIFYING LINEAR DISPLACEMENTS
Filed April 1, 1939
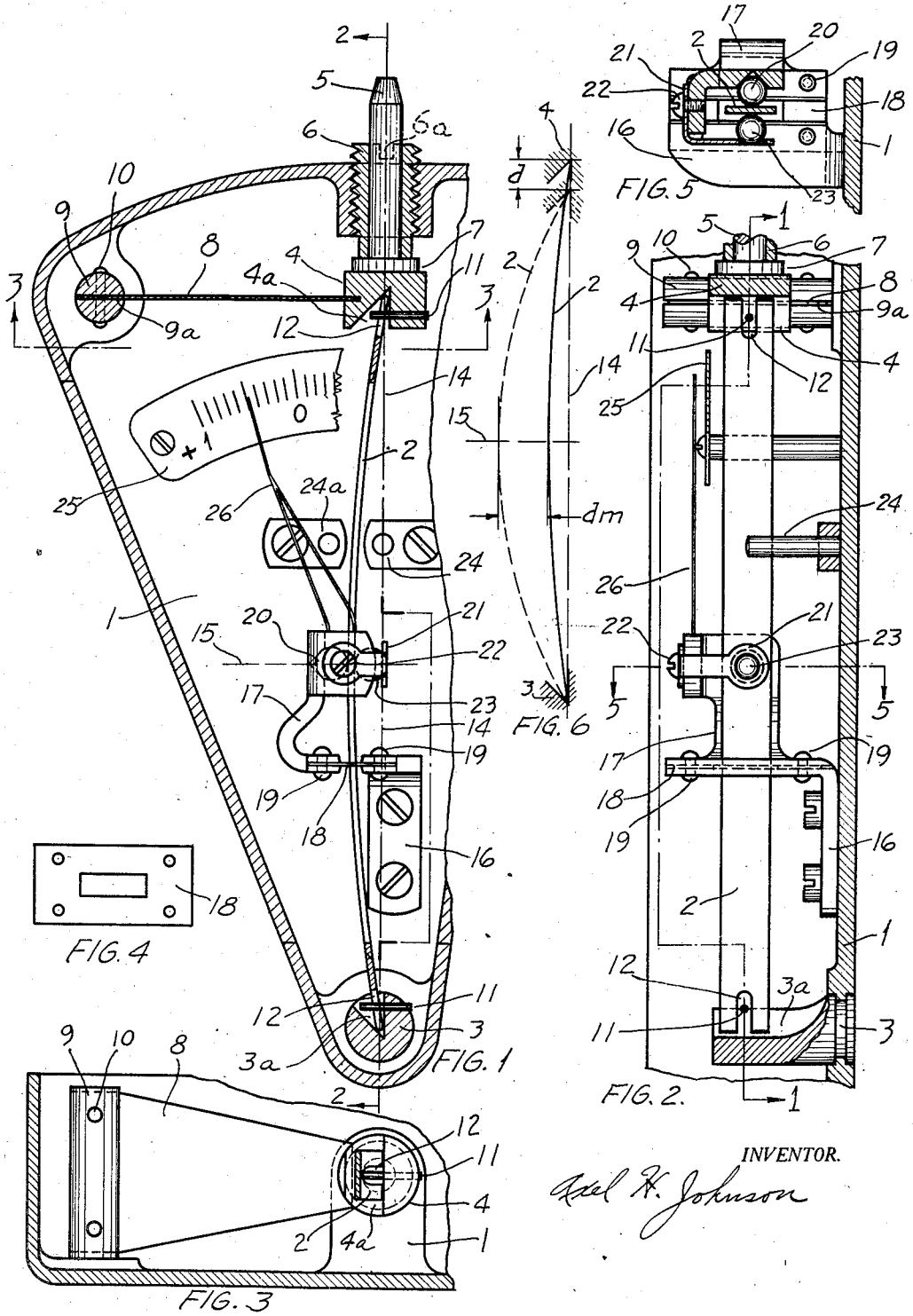
INVENTOR.
Axel H. Johnson Patented July 23, 1940

2,208,635

UNITED STATES PATENT OFFICE 2,208,635

MEANS OF AMPLIFYING LINEAR DISPLACEMENTS

Axel H. Johnson, Peru, Ill.

Application April 1, 1939, Serial No. 265,609

9 Claims. (Cl. 33—172)

My invention relates to a class of instruments which are known as indicators, and which are used to amplify, and indicate the magnitude of, linear displacements. For example; to test concentricity of work being machined in a lathe, and to compare objects with linear standards when it is desired to know the magnitude of the said objects. It is obvious that instruments of this nature must be accurate and dependable, and rugged enough to be useful in general shop work.

The general object of my invention is to provide an instrument which is accurate, dependable and rugged, and also low enough in cost to place it within the reach of all who desire such an instrument. One of the reasons for the present high cost of these instruments is, that to attain the accuracy and dependability required, it is necessary to embody a number of accurate moving parts. To insure lasting accuracy these parts necessarily must be reasonably free from wear; an attribute which cannot be attained without high manufacturing costs. One object in simplifying such instruments is to eliminate as much as possible the need for frequent repairing, which when necessary, removes the instrument from use while being repaired.

Pivots which tend to wear, and are therefore a frequent source of trouble, and are responsible for some inaccurate indications, have been eliminated in my invention. The simple construction made possible by embodying my invention in an indicator results in an instrument which is very rugged and is not easily damaged by abuse.

My invention is based on a principle which is well known to those skilled in the art to which it relates. I have not attempted to analyze the mathematical basis for the principle which is embodied in my invention, as it is a law of nature and need not be discussed here. Explained practically, my invention comprises a resilient member which is bowed laterally by being supported at the extremities thereof. One extremity of the bowed member is supported against displacement, while the other extremity is free to be displaced so as to increase or decrease the bow of said member. The amount of change in the magnitude of the bow per unit of said displacement, is an amplification of the said unit. I thus provide a means of amplification by the use of only one member.

It is customary to provide a secondary means of amplification which also comprises a means of indicating the amplitude of the displacements measured. In my invention I have embodied a simple lever, the construction and function of which, I will later describe.

The amplification obtained with instruments embodying my invention is inversely proportional to the magnitude of the bow of the resilient member. Therefore, it is necessary to calibrate an initial scale and having done this, all other instruments of like design and adjustment will have scales made by some suitable method of production, and will not require individual calibration. This variable spacing of the scale divisions is slight and is not objectionable, as there are existent several examples of instruments which have variable-spaced divisions, such as slide rules and electrical measuring instruments, which are accepted without questions or objections concerning the variable spacing.

Referring to the drawing:

Fig. 1 is a plan view of my invention thru section 1—1 of Fig. 2.

Fig. 2 is a view thru section 2—2 of Fig. 1.

Fig. 3 is a view thru section 3—3 of Fig. 1.

Fig. 4 is a view of the flexible web 18.

Fig. 5 is a view thru section 5—5 of Fig. 2.

Fig. 6 is a diagrammatic view of the principle upon which my invention is based.

Numbers in the following description refer to corresponding numbers on the drawing.

Fig. 6 shows diagrammatically, the embodiment of the above mentioned principle in my invention. Resilient member 2 is mounted in a bowed position with one extremity of said member supported against displacement, while the other extremity is free to be displaced. Therefore, a displacement $d$ along the axis 14 tends to increase or decrease the amount of bow of the resilient member 2 in a direction normal to the axis 14 and along the axis 15. Therefore, if the amplification obtained by the resilient member 2 is represented by $m$, the amplification for a unit of displacement $d$ will be $d \cdot m$. The factor $m$ is dependent upon the initial setting of the resilient member 2 with respect to the magnitude of the bow. The axis 15 is disposed substantially at the mid-point of the resilient member 2.

1 is a case or other support of a design to suit the specific requirement. The resilient member 2 which comprises the primary means of amplification is preferably of metal and of a rectangular cross-section. Member 2 is supported at the extremities thereof by bearing seats 3 and 4. The said bearing seats have V-shaped notches 3a and 4a, which notches form the seats for resilient member 2. The said bearing seats are disposed a distance apart substantially less than the flat length of the resilient member 2, thus retaining the said member in a bowed position and insuring a positive contact between the extremities of member 2 and the bearing seats 3 and 4; thus eliminating the possibility of play at this point. Friction is diminished between the extremities of the resilient member 2 and the V-shaped notches 3a and 4a by making the extremities of the said member 2 cylindrical in shape. Pins 11, integral with bearing seats 3 and 4, engage with slots 12 to prevent dislodgement of resilient member 2.

Bearing seat 3 is integral with support 1, and comprises the fixed support for one extremity of resilient member 2. Bearing seat 4 is free to be displaced, but said displacement is limited to axis 14 which axis is common to the extremities of the resilient member 2 and contact member 5. I limit bearing seat 4 to displacement along the axis 14 by the use of a play-neutralizing web 8 which is relatively thin and flexible. Web 8 is disposed with the plane thereof normal to the above-mentioned axis 14. One extremity of the web 8 is integral with the post 9, being secured thereto in slot 9a by rivets 10. Post 9 is integral with, and is fixedly mounted on, support 1. The other extremity of web 8 is integral with bearing seat 4. It is evident that the bearing seat 4 will be free to respond to displacements along the axis 14, but owing to the rigidity of web 8 normal to axis 14, the bearing seat 4 will not deviate laterally from the said axis 14. This limitation of bearing seat 4 is necessary to insure accuracy of the instrument, as any lateral displacement of the bearing seat 4 would clearly affect the lateral position of said bearing seat, and consequently the resilient member 2. Web 8 serves also as a means to prevent the unavoidable play, between contact member 5 and bushing 6, from laterally influencing bearing seat 4.

Contact member 5 extends from support 1, and the function of said member 5 is to transmit linear displacements to be measured, to bearing seat 4. Head 7 of contact member 5 forms a seat for bearing seat 4 and prevents the said seat from tipping. Head 7 also co-acts with the inner end of bushing 6 and provides a means of initially adjusting the instrument. Bushing 6 is threaded into support 1 and is provided with a means of adjustment 6a so that the bow of resilient member 2 can be set to a definite arc. This adjustment when once made is not disturbed, except to compensate for wear. Contact member 5 is a sliding fit in bushing 6.

As a further means of amplifying, and also to indicate, the magnitude of linear displacements, my invention embraces a simple lever. Lever base 16 is integral with support 1 and carries lever body 17. Lever base 16 and lever body 17 are pivotally connected together by a flexible web 18 and rivets 19. This form of pivot induces practically no friction or play. Fulcrum 20 is fixedly mounted on lever body 17 and makes contact with the resilient member 2 at substantially the mid-point of said member. With my invention it is necessary to have a second fulcrum member 23 so as to maintain lever body 17 in a co-acting relation with resilient member 2. The said fulcrum members 20 and 23 are held in contact with resilient member 2 by spring seat 21 and screw 22. Thus a positive but resilient construction is obtained which offers practically no resistance to a free functioning of the instrument. This construction also eliminates the variable resistance offered by coil or flat springs which impair the accuracy of instruments of this class. Stops 24 and 24a are intended to prevent excessive displacement of resilient member 2. Pointer 26 may be of any suitable construction, and scale 25 likewise, may be of a character peculiar to the specific instrument with which it will be used.

I claim:

1. A multiplying lever for amplifying linear displacements, comprising a lever base, a lever body, pivotal connection between said lever base and lever body, a fulcrum fixedly mounted on said lever body, an auxiliary fulcrum integral with said lever body and oppositely disposed to said fixed fulcrum and a displacement-producing member in contact with, and intermediately between, said fixed fulcrum and said auxiliary fulcrum.

2. A multiplying lever for amplifying linear displacements, comprising a bracket, a lever body, pivotal connection between said bracket and said lever body, a spherical fulcrum fixed to said lever body, a like and opposed spherical fulcrum resiliently mounted integral with said lever body and a displacement-producing member in positive contact intermediate between said spherical fulcrums.

3. A means of preventing lateral displacements from introducing errors in linear-displacement measuring devices, comprising a support, a displaceable bearing seat for an amplifying member, a flexible web-like member, one extremity thereof integral with the said support, the other extremity integral with the said displaceable bearing seat, thereby allowing displacement of said bearing seat only in a direction normal to the plane of said web-like member.

4. A play-eliminating means for linear-displacement measuring devices, comprising a flexible web disposed with the plane thereof normal to the displacements to be measured, a frame, a measuring-element support, one extremity of said flexible web being fixed to said frame, and the other extremity thereof being integral with said measuring-element support, said support displaceable normal to the plane of said flexible web.

5. In a means of amplifying linear displacements, a resilient amplifying member, bearing seats disposed at the extremities of, and confining said member to a bowed position, one of said bearing seats being fixed and the other displaceable to allow variation in the bow of said amplifying member, a contact member detached from, but co-operating with said displaceable bearing seat to convey displacements to be amplified to said amplifying member, means to prevent lateral displacement of said displaceable bearing seat comprising a flexible member, one extremity of which is integral with said displaceable bearing seat, the other extremity being fixed against displacement, and means coacting with the mid-point of said amplifying member to amplify the variation in bow of said amplifying member.

6. In a means of amplifying linear displacements, a resilient amplifying member, bearing seats disposed at the extremities of, and confining said member to a bowed position, one of said bearing seats being fixed and the other displaceable to allow variation in the bow of said amplifying member, a contact member co-operating with said displaceable bearing seat to vary the bow of said amplifying member, means for preventing lateral displacement of said displaceable bearing seat, and means co-acting with said amplifying member intermediate the extremities thereof for amplifying the variation in bow of said member.

7. In a means of amplifying linear displacements, a flexible, bowed amplifying member, abutments disposed at the extremities of said member, one of said abutments being displaceable, a displacement-transmitting member coacting with the said displaceable abutment to effect changes in the bow of said amplifying member, means to confine said displaceable abutment to movement along one initial axis and additional amplifying means disposed intermediate the extremities of said amplifying member and co-operating therewith to amplify the variations in bow of said amplifying member in a direction normal to the curve of said bowed member.

8. In a means of amplifying linear displacements, a resilient amplifying member of rectangular cross-section, supports at the extremities thereof and confining said member to a lateral-deflected position, a contact member to transmit linear displacements to the said member whereby the deflection thereof is varied, and a multiplying lever the fulcrum of which is disposed intermediate the extremities of said member and in co-operation therewith to amplify the said deflections.

9. In a means of amplifying linear displacements, a resilient member, displaceable supports disposed at the extremities thereof and confining the said member to an arcuate position, yieldable planar means co-operating with said supports to prevent lateral displacement thereof, contact means to convey linear displacements to the said supports whereby a variation in arc of said member is effected, and means disposed intermediate the extremities of said member and co-operating therewith to indicate the variation in arc of said resilient member.

AXEL H. JOHNSON.